(12) United States Patent
Katsumata et al.

(10) Patent No.: US 7,639,481 B2
(45) Date of Patent: Dec. 29, 2009

(54) HINGE DEVICE OF PLANE DISPLAY

(75) Inventors: Tsutomu Katsumata, Osaka-hu (JP); Takayuki Kaneko, Osaka-hu (JP)

(73) Assignee: Simotec Inc., Osaka-Hu (JP)

( * ) Notice: Subject to any disclaimer, the term of this patent is extended or adjusted under 35 U.S.C. 154(b) by 0 days.

(21) Appl. No.: 11/957,881

(22) Filed: Dec. 17, 2007

(65) Prior Publication Data

US 2009/0154083 A1    Jun. 18, 2009

(51) Int. Cl.
*H05K 7/00* (2006.01)
(52) U.S. Cl. ............................. 361/679.07; 361/679.22; 248/921
(58) Field of Classification Search .................. 361/681, 361/679.07, 679.22; 248/921
See application file for complete search history.

(56) References Cited

U.S. PATENT DOCUMENTS

| | | | |
|---|---|---|---|
| 6,189,842 B1 * | 2/2001 | Bergeron Gull et al. | 248/125.1 |
| 6,921,057 B2 * | 7/2005 | Chen et al. | 248/349.1 |
| 7,434,774 B1 * | 10/2008 | Floersch et al. | 248/183.2 |
| 7,457,131 B2 * | 11/2008 | Kaneko | 361/755 |

* cited by examiner

*Primary Examiner*—Jayprakash N Gandhi
*Assistant Examiner*—Ingrid Wright
(74) *Attorney, Agent, or Firm*—Browdy and Neimark, PLLC (57) ABSTRACT

A hinge device of a plane display capable of manually rotating in lateral horizontal direction, manually inclining (tilting, laying) in longitudinal direction, and manually adjusting the height in vertical direction simultaneously. It includes a mechanism for supporting the plane display in lower part, and rotating it manually in lateral horizontal direction, a mechanism for tilting manually in longitudinal direction, and a mechanism for elevating manually in vertical direction, in which the rotary mechanism includes horizontal rotary position holding means, and transmitting means for transmitting rotary motion in lateral horizontal direction to the horizontal rotary position holding means; the longitudinal direction tilting mechanism includes longitudinal tilting position holding means, and transmitting means for transmitting longitudinal tilting motion to the longitudinal tilting position holding means; and the vertical direction elevating mechanism includes elevating position holding means, and transmitting means for transmitting elevating motion to the elevating position holding means.

6 Claims, 10 Drawing Sheets

HINGE DEVICE OF PLANE DISPLAY

TECHNICAL FIELD

The present invention relates to a hinge device of a plane display for manually rotating a plane display such as liquid crystal display or plasma display in lateral horizontal direction, manually inclining (tilting, laying) in longitudinal direction, and manually elevating in vertical direction.

TECHNICAL BACKGROUND

A conventional hinge device of a plane display includes a display support device (see, for example, patent document 1) capable of changing a heavy display panel in its direction of panel surface (horizontal angle, laying angle). Other example is a stand for a display monitor for elevating the display monitor by creating a weak friction when moving up an elevating member by one-way clutch or torque limiter for composing a friction mechanism (see, for example, patent document 2).

Neither of these conventional devices did not include a hinge device for rotating in lateral horizontal direction, tilting in longitudinal direction, and elevating in vertical direction.

[Patent document 1] Japanese Patent Application Laid-Open No. 2005-208080

[Patent document 2] Japanese Patent Application Laid-Open No. 2005-300922

DISCLOSURE OF THE INVENTION

Problem to be Solved by the Invention

It is hence an object of the invention to present a hinge device of a plane display capable of manually rotating a plane display in lateral horizontal direction, manually inclining (tilting, laying) in longitudinal direction, and manually adjusting the height in vertical direction simultaneously, and manipulating manually easily and in a simple structure.

Means for Solving Problem

The hinge device of a plane display of the invention includes a mechanism for supporting a plane display in lower part, and rotating it manually in lateral horizontal direction, a mechanism for tilting manually in longitudinal direction, and a mechanism for elevating manually in vertical direction, in which the rotary mechanism in lateral horizontal direction includes horizontal rotary position holding means, and transmitting means for transmitting rotary motion in lateral horizontal direction of the plane display to the horizontal rotary position holding means; the longitudinal direction tilting mechanism includes longitudinal tilting position holding means, and transmitting means for transmitting longitudinal tilting motion of the plane display to the longitudinal tilting position holding means; and the vertical direction elevating mechanism includes elevating position holding means, and transmitting means for transmitting elevating motion of the plane display to the elevating position holding means. The horizontal rotary position holding means is rotational friction means. The rotary motion transmitting means includes a display mounting frame attached to the rear side of the plane display, a guide frame elevatably mounting the display mounting frame, a tilting plate for mounting and fixing the guide frame, a lateral rotary plate tiltably mounting the tilting plate, and a working gear fixed to the lateral rotary plate and coupled to the horizontal rotary position holding means. The longitudinal tilting position holding means is friction means composed of a plurality of friction plates. The transmitting means of the longitudinal tilting motion includes a display mounting frame attached to the rear side of the plane display, a guide frame elevatably mounting the display mounting frame, a tilting plate for mounting and fixing the guide frame, and a horizontal pivot for transmitting the tilting motion of the tilting plate to the longitudinal tilting position holding means. It further includes at least one pair of torsion springs provided on the horizontal pivot, disposed between the tilting plate and lateral rotary plate, and mutually reverse in torsion direction. The elevating position holding means is rotational friction means. The elevating motion transmitting means includes a display mounting frame attached to the rear side of the plane display, a vertical moving plate attached to the display mounting frame, and a pinion rotatably provided in the vertical moving plate, engaged with a rack provided in a vertical base plate, and coupled to the elevating position holding means.

Effects of the Invention

It is an advantage of the hinge device of a plane display of the invention because it is capable of manually rotating a plane display in lateral horizontal direction, manually inclining (tilting, laying) in longitudinal direction, and manually adjusting the height in vertical direction simultaneously, and hence manipulating manually easily and in a simple structure.

The Best Mode for Carrying out the Claimed Invention

Figure 1:
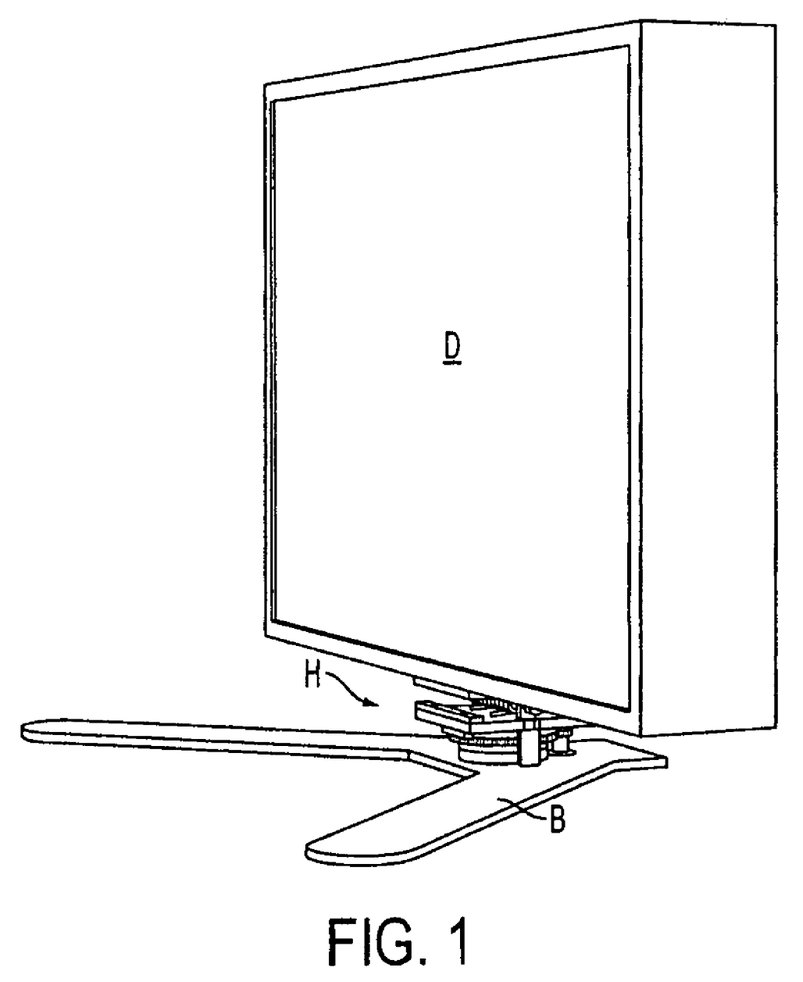
FIG. 1 is an overall perspective view of a plane display provided with a hinge device of the invention.

FIG. 1 is an overall perspective view of a plane display having thee hinge device of the invention, in which reference D is a plane display such as liquid crystal display or plasma display, and H is a hinge device for supporting the plane display D in lower part, manually rotating it in lateral horizontal direction, manually inclining (tilting, laying) in longitudinal direction, and manually elevating in vertical (height) direction. Reference B is a base plate, which stably holds the plane display D by way of the hinge device H.

Figure 2:
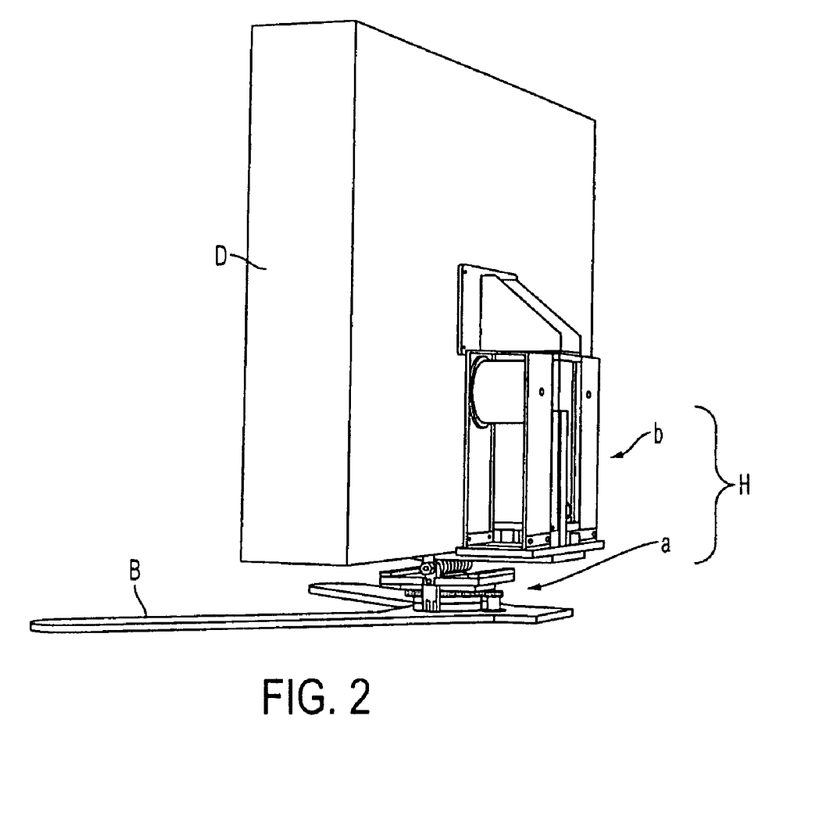
FIG. 2 is an overall perspective view as seen from an oblique reverse side of FIG. 1.
Figure 3:
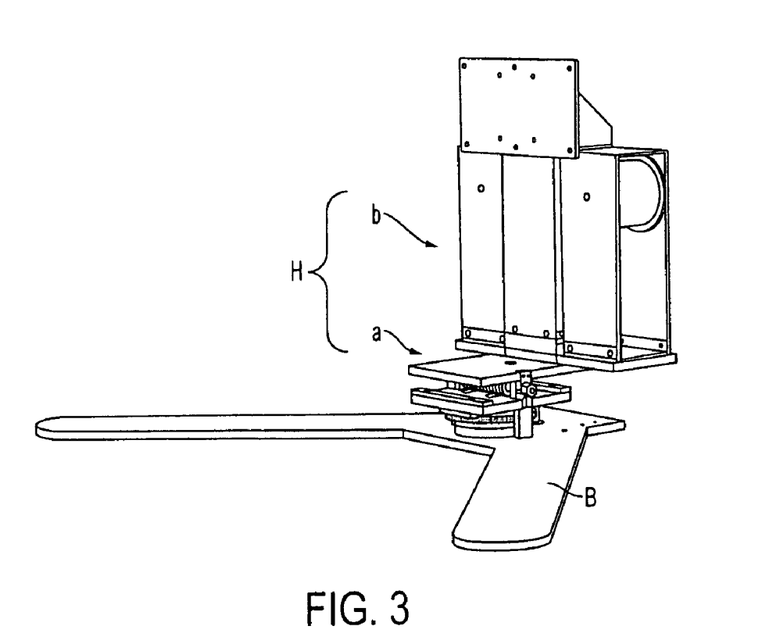
FIG. 3 is a magnified perspective view of hinge device and base plate.

As clear from FIG. 2, the hinge device H is composed of a first hinge portion (a) for rotating in lateral horizontal direction, and tilting manually also in longitudinal direction, and a second hinge portion (b) for elevating and moving in vertical direction. FIG. 3 is a magnified perspective view of the hinge device H and base plate B shown in a state after removing the plane display D.

Figure 4:
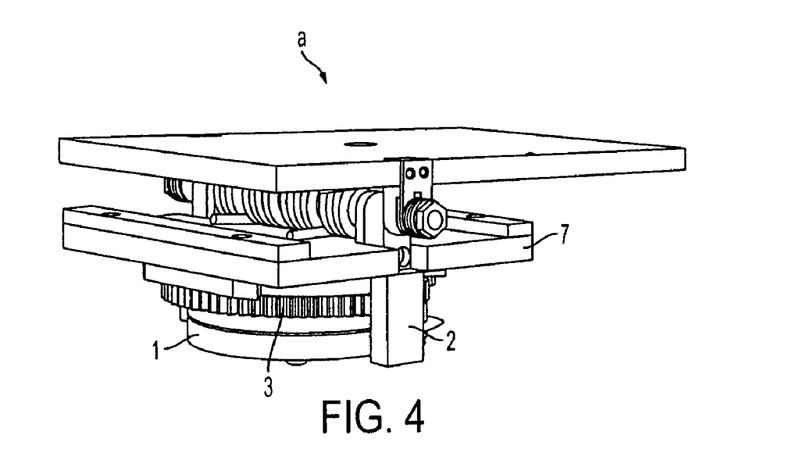
FIG. 4 is a magnified perspective view of first hinge portion.

FIG. 4 is a further magnified view of the first hinge portion (a), in which a base board 1 and a stopper 2 are attached and fixed to the base plate B (see FIG. 3). The base board 1 is provided with a working gear 3 rotatably.

Figure 5:
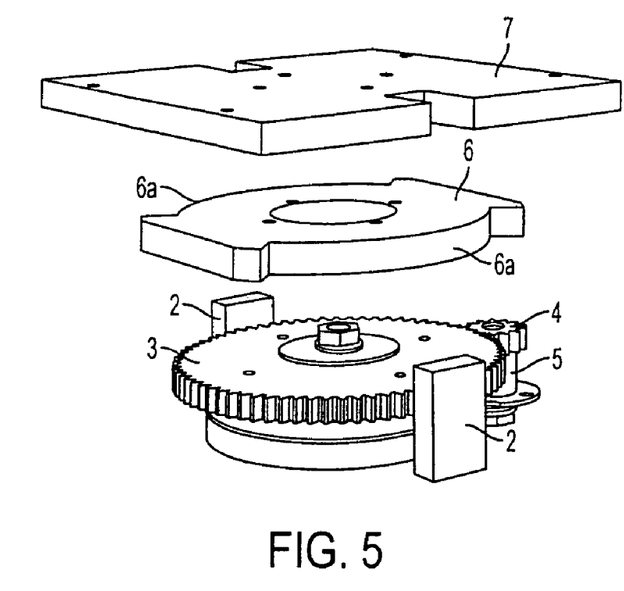
FIG. 5 is an exploded perspective view of horizontal rotation mechanism.

As clear from FIG. 5, the working gear 3 is coupled to rotational friction means 5, such as a plurality of rotational friction plates, by way of a pinion 4. Therefore, the working gear 3 is designed to stop stably at an arbitrary rotating position by means of the rotational friction means 5.

The working gear 3 is provided with a stopper plate 6. The stopper plate 6 has a notch 6a formed along a specified expected angle, and the rotational angle is defined by the stopper 2. A lateral rotary plate 7 is integrally provided and fixed on the stopper plate 6.

Figure 6:
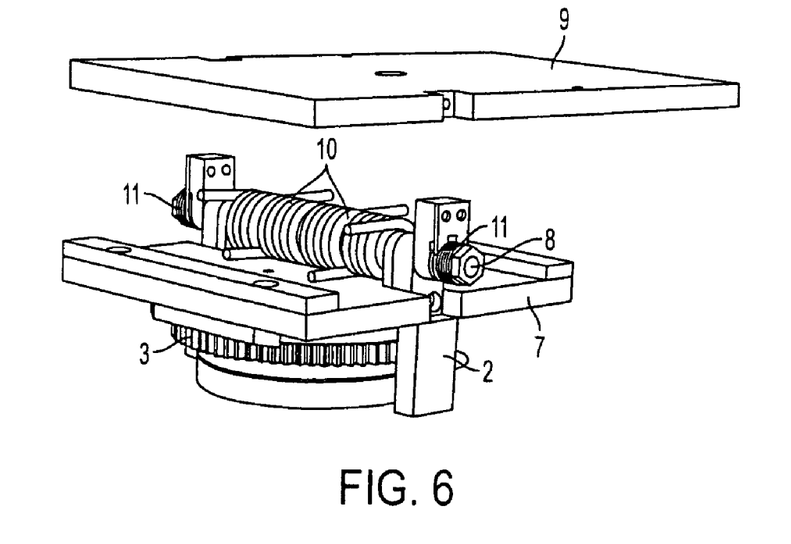
FIG. 6 is an exploded perspective view of first hinge portion.

As shown in FIG. 4, the lateral rotary plate 7 is tiltably provided with a tilting plate 6 by way of a horizontal pivot 8. As clear from FIG. 6, the horizontal pivot 8 is provided with a torsion spring 10, and one end of the spring abuts against the lateral rotary plate 7, while other end abuts against the tilting plate 9. The torsion springs 10 are provided at least in one pair (two pairs in the embodiment), and are mutually reverse in the torsion direction. The horizontal pivot 8 is provided with friction means 11 composed of a plurality of friction plates. Therefore, the tilting plate 9 is designed to tilt manually and easily by the torsion springs 10, and to stop stably at an arbitrary tilting position by the friction means 11.

Figure 7:
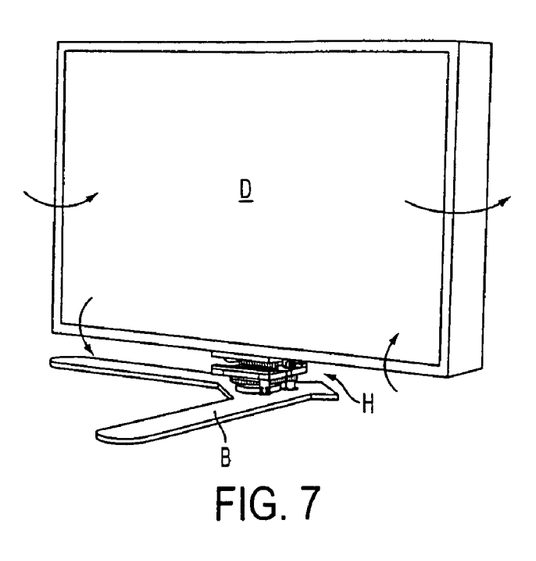
FIG. 7 is an overall perspective view of plane display manually rotated in left horizontal direction.
Figure 8:
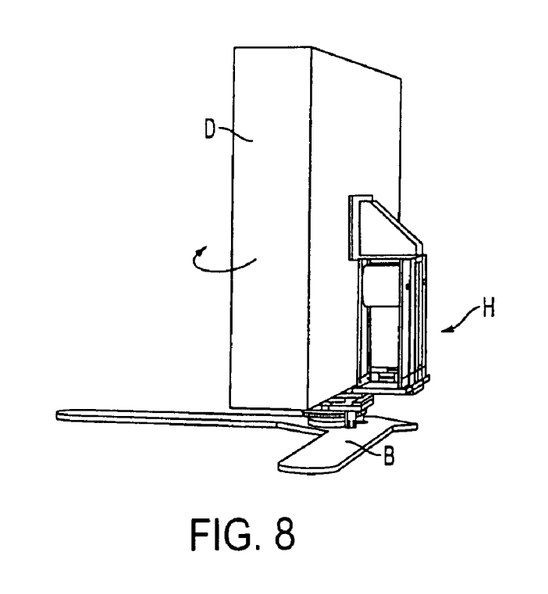
FIG. 8 is an overall perspective view of plane display manually rotated in right horizontal direction.
Figure 9:
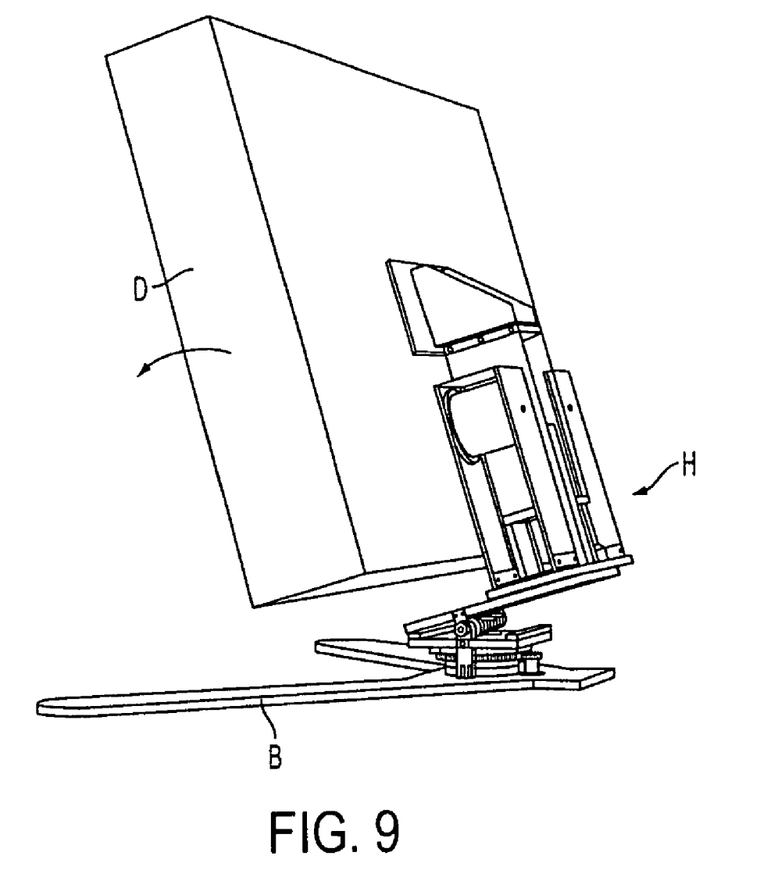
FIG. 9 is an overall perspective view of plane display manually tilted in front direction.
Figure 10:
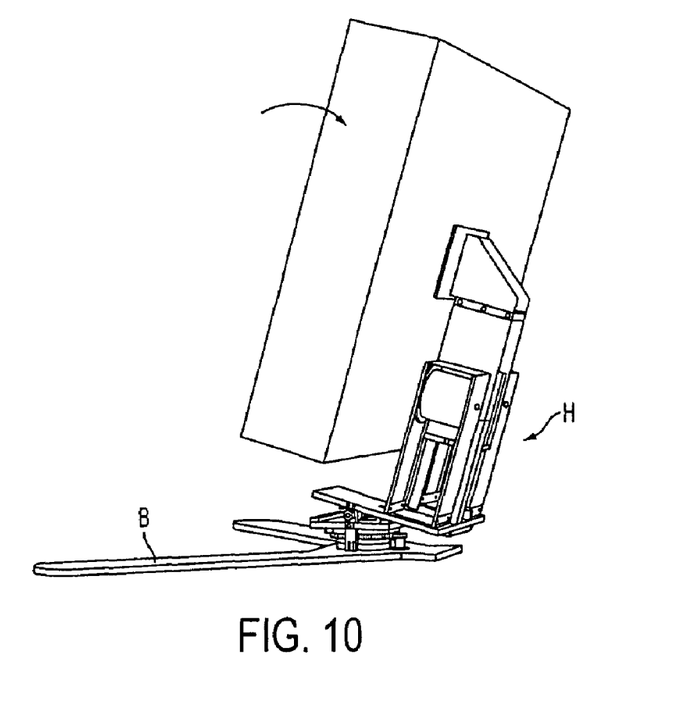
FIG. 10 is an overall perspective view of plane display manually tilted in rear direction.

By the first hinge portion (a), the plane display D is manually rotated in lateral horizontal direction as shown in FIG. 7 and FIG. 8, and is stopped stably at an arbitrary horizontal rotation position, or as shown in FIG. 9 and FIG. 10, the plane display D is manually tilted (laid) in longitudinal direction, and is stopped stably at an arbitrary tilting position.

Figure 11:
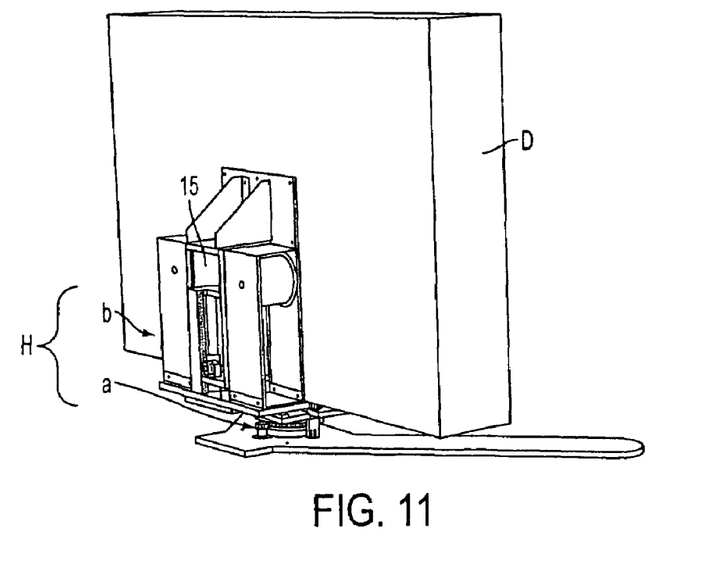
FIG. 11 is an overall perspective view of plane display showing second hinge portion.
Figure 12:
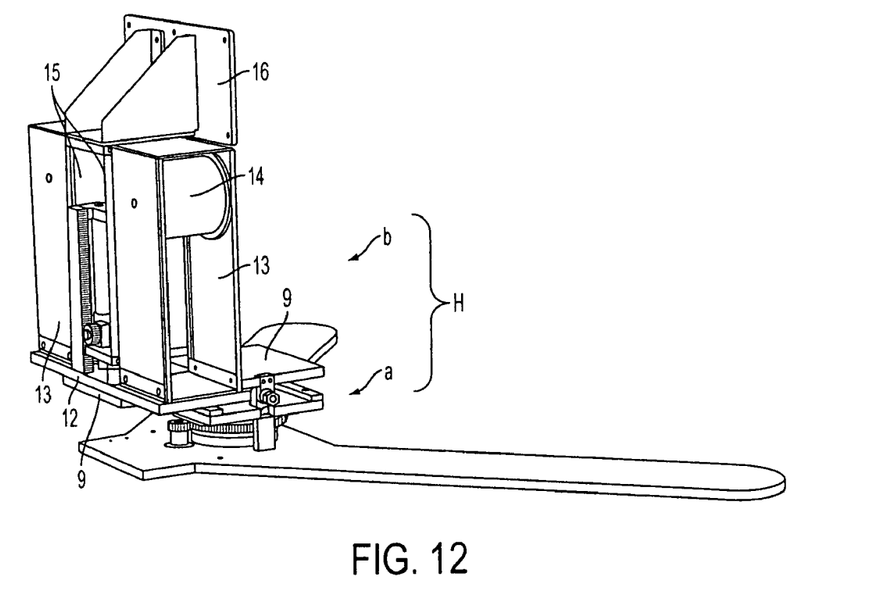
FIG. 12 is a magnified perspective view of second hinge portion.

As clear from FIG. 11 and FIG. 12, on the tilting plate 9 of the second hinge portion (b), a vertical base plate 12 of the second hinge portion (b) is mounted and fixed. The vertical base plate 12 is provided with guide frames 13 at right and left positions. Constant load spring cone stones 14 are rotatably mounted in the upper part of the guide frames 13.

Figure 13:
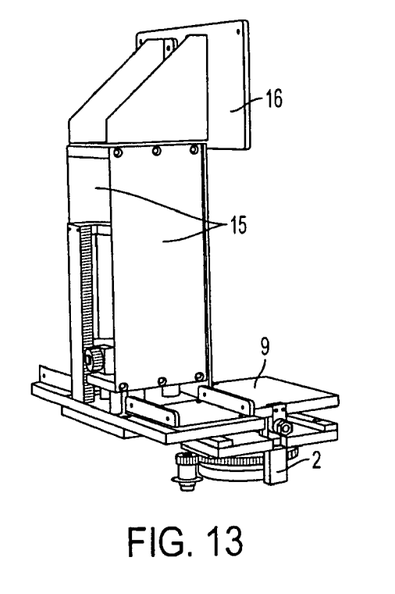
FIG. 13 is a perspective view of essential parts in FIG. 12.

Between the right and left guide frames 13, a vertical slide frame 15 (see also FIG. 13) is inserted, and the leading ends of the right and left constant load spring cone stones 14 are fixed in lower part of the frame 15 and suspended in a vertically movable manner. At the upper end of the vertical slide frame 15, a display mounting frame 16 for mounting and fixing the plane display D is provided.

Figure 14:
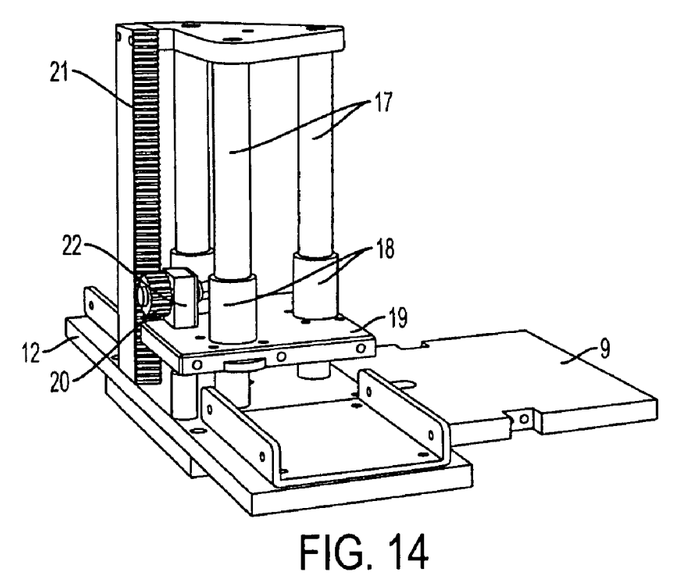
FIG. 14 is an operation explanatory diagram of second hinge portion.

FIG. 14 is a diagram for explaining the vertical moving (sliding) mechanism, in which a proper number of (three in this embodiment) posts 17 are planted on the vertical base plate 12. In these posts, slide sleeves 18 are externally inserted in vertical sliding state. The slide sleeves 18 are provided with a vertical moving plate 19. A pinion 20 is rotatably provided in the vertical moving plate 19. The pinion 20 is engaged with a perpendicular rack 21. The rack 21 is planted and fixed on the vertical base plate 12. Therefore, along with the vertical move of the vertical moving plate 19, the pinion 20 rolls along the perpendicular rack 21. Rotation of the pinion 20 is defined by rotation friction means 22 composed of, for example, a plurality of rotational friction plates, and the pinion 20 may be stably stopped at an arbitrary perpendicular position of the perpendicular rack 21.

Figure 15:
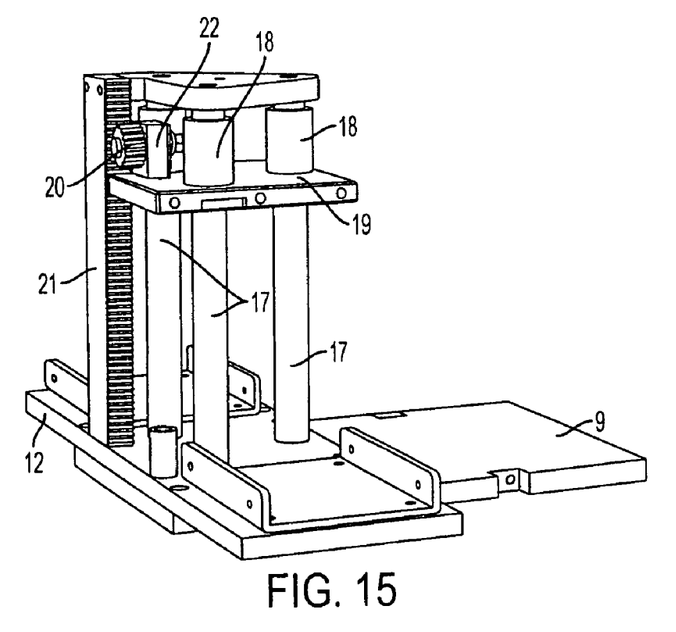
FIG. 15 is an operation explanatory diagram of second hinge portion.
Figure 16:
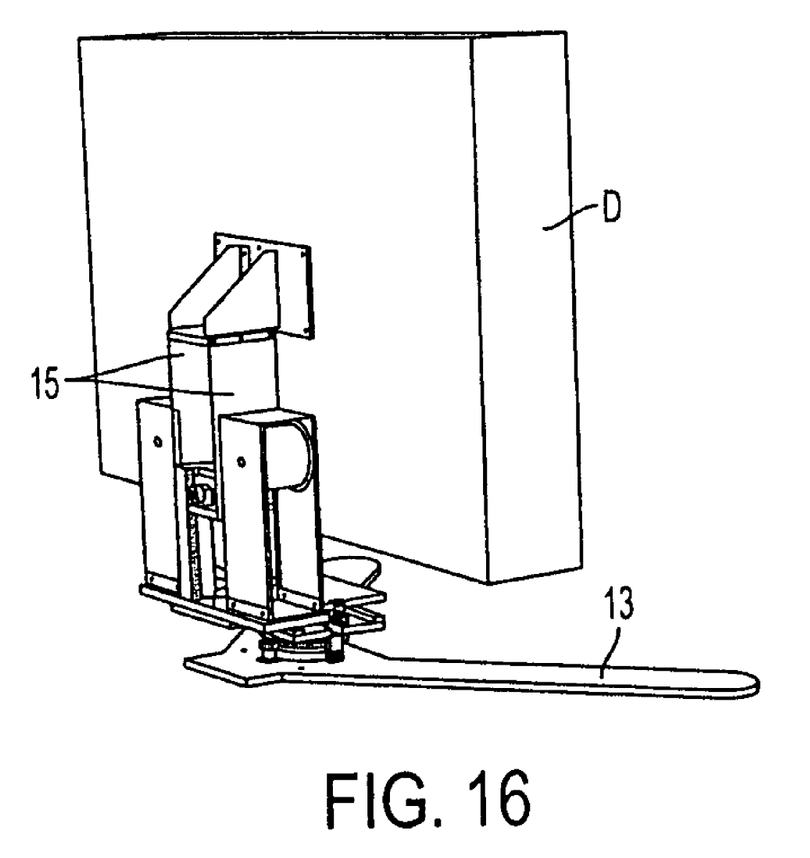
FIG. 16 is an overall perspective view of elevated state of plane display.

FIG. 15 and FIG. 16 show an elevated state of plane display D by elevation of the vertical moving plate 19.

DESCRIPTION OF THE REFERENCE NUMERALS a First hinge portion
b Second hinge portion
1 Base board
2 Stopper
3 Working gear
4 Pinion
5 Rotation friction means
6 Stopper plate
6a Notch
7 Lateral rotation plate
8 Horizontal pivot
9 Tilting plate
10 Torsion spring
11 Friction means
12 Vertical base plate
13 Guide frame
14 Constant load spring cone stone
15 Vertical slide frame
16 Display mounting frame
17 Post
18 Slide sleeve
19 Vertical moving plate
20 Pinion
21 Perpendicular rack
22 Rotation friction means
B Base plate
D Plane display
H Hinge device

DRAWINGS

FIG. 1
FIG. 2
FIG. 3
FIG. 4
FIG. 5
FIG. 6
FIG. 7
FIG. 8
FIG. 9
FIG. 10
FIG. 11
FIG. 12
FIG. 13
FIG. 14
FIG. 15
FIG. 16

What is claimed is:

1. A hinge device of a plane display comprising a mechanism for supporting a plane display in lower part, and rotating it manually in lateral horizontal direction, a longitudinal direction tilting mechanism for tilting manually in longitudinal direction, and a vertical direction elevating mechanism for elevating manually in vertical direction, wherein a rotary mechanism in lateral horizontal direction includes horizontal rotary position holding means, and rotary motion transmitting means for transmitting rotary motion in lateral horizontal direction of the plane display to the horizontal rotary position holding means; the longitudinal direction tilting mechanism includes longitudinal tilting position holding means, and tilting motion transmitting means for transmitting longitudinal tilting motion of the plane display to the longitudinal tilting position holding means; and the vertical direction elevating mechanism includes elevating position holding means, and elevating motion transmitting means for transmitting elevating motion of the plane display to the elevating position holding means;

wherein the rotary motion transmitting means includes a display mounting frame attached to a rear side of the plane display, a guide frame elevatably mounting the display mounting frame, a tilting plate for mounting and fixing the guide frame, a lateral rotary plate tiltably mounting the tilting plate, and a working gear fixed to the lateral rotary plate and coupled to the horizontal rotary position holding means.

2. The hinge device of a plane display of claim 1, wherein the horizontal rotary position holding means is rotational friction means.

3. The hinge device of a plane display of claim 1, wherein the longitudinal tilting position holding means is friction means composed of a plurality of friction plates.

4. A hinge device of a plane display comprising a mechanism for supporting a plane display in lower part, and rotating it manually in lateral horizontal direction, a longitudinal direction tilting mechanism for tilting manually in longitudinal direction, and a vertical direction elevating mechanism for elevating manually in vertical direction, wherein a rotary mechanism in lateral horizontal direction includes horizontal rotary position holding means, and rotary motion transmitting means for transmitting rotary motion in lateral horizontal direction of the plane display to the horizontal rotary position holding means; the longitudinal direction tilting mechanism includes longitudinal tilting position holding means, and tilting motion transmitting means for transmitting longitudinal tilting motion of the plane display to the longitudinal tilting position holding means; and the vertical direction elevating mechanism includes elevating position holding means, and elevating motion transmitting means for transmitting elevating motion of the plane display to the elevating position holding means;

wherein the rotary motion transmitting means of longitudinal direction tilting motion includes a display mounting frame attached to a rear side of the plane display, a guide frame elevatably mounting the display mounting frame, a tilting plate for mounting and fixing the guide frame, and a horizontal pivot for transmitting the tilting motion of the tilting plate to the tilting position holding means;

wherein the elevating motion transmitting means includes a display mounting frame attached to a rear side of the plane display, a vertical moving plate attached to the display mounting frame, and a pinion rotatably provided in the vertical moving plate, engaged with a rack provided in a vertical base plate, and coupled to the elevating position holding means.

5. The hinge device of a plane display of claim 4, further comprising at least one pair of torsion springs provided on the horizontal pivot, disposed between the tilting plate and lateral rotary plate, and mutually reverse in torsion direction.

6. The hinge device of a plane display of claim 4, wherein the elevating position holding means is rotational friction means.

\* \* \* \* \*